United States Patent
Sohng et al.

(10) Patent No.: US 7,486,741 B2
(45) Date of Patent: Feb. 3, 2009

(54) WIRELESS TRANSMITTING/RECEIVING DEVICE AND METHOD THEREOF

(75) Inventors: Kyu Ik Sohng, Suseong-Ku (KR); Duk Kyu Choi, Buk-Ku (KR); Hee Chul Kim, Buk-Ku (KR); Gwang Soon Lee, Dalseo-Ku (KR); Chang Hui Yea, Suseong-Ku (KR); Jong Keun Shin, Kyungsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 10/479,430

(22) PCT Filed: Jun. 5, 2002

(86) PCT No.: PCT/KR02/01062

§ 371 (c)(1),
(2), (4) Date: Jul. 9, 2004

(87) PCT Pub. No.: WO02/100096

PCT Pub. Date: Dec. 12, 2002

(65) Prior Publication Data

US 2004/0240579 A1    Dec. 2, 2004

(30) Foreign Application Priority Data

Jun. 5, 2001    (KR) .............................. 2001-31337

(51) Int. Cl.
*H04L 25/34* (2006.01)
(52) U.S. Cl. ..................................... 375/286; 375/316
(58) Field of Classification Search ................ 375/146, 375/219, 295, 298, 286, 259, 260, 285, 309, 375/265, 262, 316, 341, 340, 342, 372
See application file for complete search history.

(56) References Cited

U.S. PATENT DOCUMENTS 5,077,761 A * 12/1991 Tokunaga .................... 375/371

(Continued)

FOREIGN PATENT DOCUMENTS

EP    1 161 041 A2    5/2001

(Continued)

OTHER PUBLICATIONS

Moonky Lee, Jong Gyu Kim, Howoong Lee, Frank Templin and Paul Snopko, Revised Record/Playback Interface Systems for GA-HDTV, HD-VCR and D3 VTR, LG Electronics and Zenith Electronics Corporation, IEEE Transactions on Consumer Electronics, vol. 42, No. 1, Feb. 1996.*

*Primary Examiner*—Chieh M Fan
*Assistant Examiner*—Aristocratis Fotakis
(74) *Attorney, Agent, or Firm*—Ked & Associates, LLP (57) ABSTRACT

The present invention discloses a wireless transmitting/receiving apparatus for transmitting and receiving large amounts of digital data using a commercial wireless transmitting/receiving apparatus. The wireless transmitting apparatus includes a data converter for mapping multibit digital data by a data symbol in accordance with a predetermined mapping table, for converting the data symbol to an analog signal, and for outputting the analog signal, and a wireless transmitter for modulating the analog signal and for transmitting the signal wirelessly. The wireless receiving apparatus includes a wireless receiver for demodulating a wireless signal received to an analog signal, and a data restoration section for converting the analog signal to a digital signal in accordance with a predetermined mapping table, conducting an inverse symbol mapping on the digital signal, and outputting the digital signal.

6 Claims, 10 Drawing Sheets

U.S. PATENT DOCUMENTS

| | | | |
|---|---|---|---|
| 5,229,853 A * | 7/1993 | Myers ........................ 348/458 |
| 5,361,097 A * | 11/1994 | Kolczynski ............ 375/240.01 |
| 5,379,322 A * | 1/1995 | Kosaka et al. ................ 375/296 |
| 5,604,541 A * | 2/1997 | Kim et al. ................. 348/426.1 |
| 5,619,269 A * | 4/1997 | Lee et al. ................ 375/240.01 |
| 5,675,372 A | 10/1997 | Aguayo, Jr. et al. |
| 5,831,690 A * | 11/1998 | Lyons et al. ........... 375/240.28 |
| 5,835,155 A * | 11/1998 | Jennes et al. ................. 348/536 |
| 5,987,070 A * | 11/1999 | Fimoff et al. ................ 375/286 |
| 5,999,221 A * | 12/1999 | Nayebi et al. ............... 348/521 |
| 6,094,461 A * | 7/2000 | Heron ........................ 375/317 |
| 6,233,295 B1 * | 5/2001 | Wang ......................... 375/364 |
| 6,442,211 B1 * | 8/2002 | Hampel et al. .............. 375/260 |
| 6,810,084 B1 * | 10/2004 | Jun et al. ................ 375/240.28 |
| 7,155,016 B1 * | 12/2006 | Betts et al. ................... 380/268 |
| 2001/0021305 A1 | 9/2001 | Sugiyama |

FOREIGN PATENT DOCUMENTS

| | | |
|---|---|---|
| EP | 1 176 763 A2 | 7/2001 |
| WO | WO 00/07340 | 7/1999 |

* cited by examiner

FIG. 10 under 35 U.S.C. § 371 and claims priority to International Application No. PCT/KR02/01062 which has an International filing date of Jun. 5, 2002, published on Dec. 12, 2002, Publication No. WO 02/100096 A1 and which designated the United States of America, the entire contents of which are hereby incorporated by reference.

WIRELESS TRANSMITTING/RECEIVING DEVICE AND METHOD THEREOF

This application is the National Phase under 35 U.S.C. § 371 and claims priority to International Application No. PCT/KR02/01062 which has an International filing date of Jun. 5, 2002, published on Dec. 12, 2002, Publication No. WO 02/100096 A1 and which designated the United States of America, the entire contents of which are hereby incorporated by reference.

TECHNICAL FIELD

The present invention relates to a wireless transmitting/receiving apparatus and method. In particular, the present invention relates to a wireless transmitting/receiving apparatus and method that can transmit and receive a large amount of digital data using a commercial wireless transmitter/receiver.

BACKGROUND ART

It has been long since a wireless infrared transmitter/receiver were commercialized. Now one can easily get the small-sized transmitter/receiver at a very low price. In contrast, a transmitter/receiver for transmitting and receiving a large amount of digital data is very complicated and expensive, and thus it has been a burden on the public to use in everyday life. Therefore, scientists' interest naturally turned to the development of an inexpensive transmitting/receiving apparatus that can transmit and receive enormous digital data wirelessly.

For example, a wall television receiver that adopts a display element such as a PDP (Plasma Display Panel) or LCD (Liquid Crystal Display) has been developed as a multimedia display apparatus.

However, the wall television receiver as the multimedia display apparatus is not always convenient though. For one thing, when the wall television receiver is used for the multimedia display apparatus, a plurality of signal sources should be connected to the television receiver by wire, which consequently limits not only the clearance between the wall television receiver and the plurality of sources, but also the position for installing the television receiver. Besides, many lines for connecting the sources and the wall television receiver obviously spoils the beauty of the wall.

Figure 1:
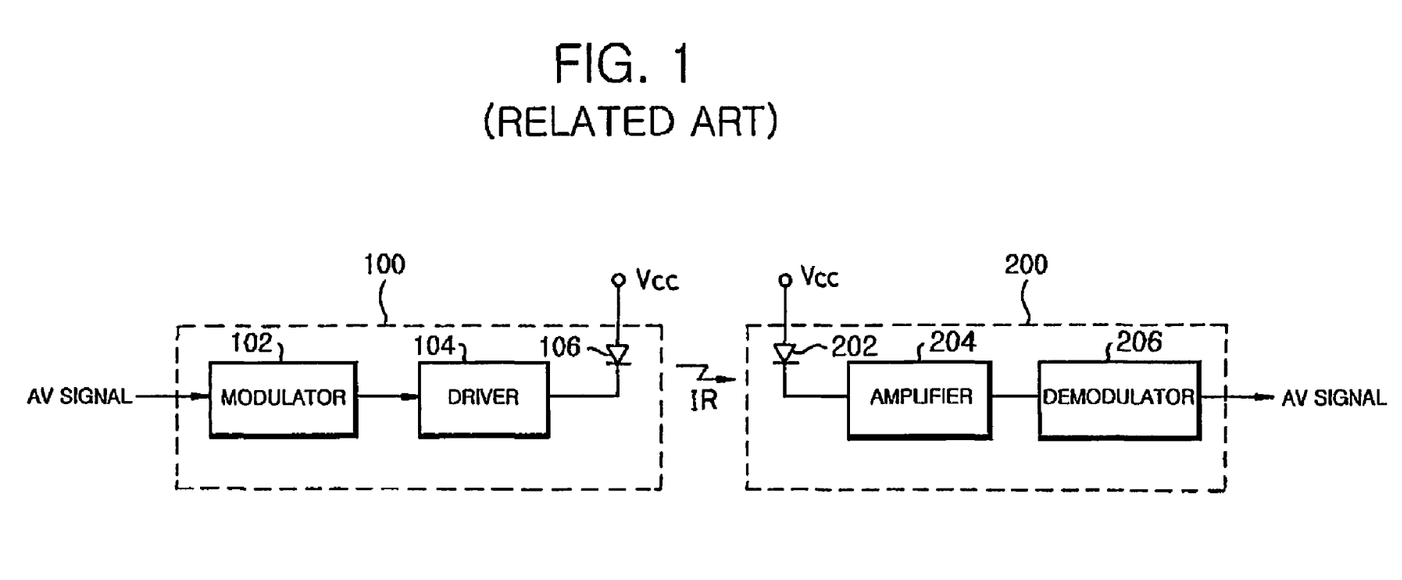
FIG. 1 is a block diagram illustrating a conventional wireless transmitting/receiving apparatus.

In order to solve the above-described problems, an infrared transmitter/receiver that interfaces a wall television receiver and a plurality of sources by wireless has been adopted. The technology employed in this conventional infrared transmitting/receiving apparatus is not explained with reference to a block diagram shown in FIG. 1. As depicted in FIG. 1, the infrared transmitting/receiving apparatus largely includes a transmitter 100 installed in the source, and a receiver 200 installed in the wall television receiver.

A modulator 102 in the transmitter 100 modulates AV (Audio and Video) signals transmitted from a source, and prevents any type of cross with other apparatus using the infrared technology, such as a remote controller or a wireless headphone, etc. Also, the modulator 102 is very useful for minimizing noises generated due to the surrounding environment like sunwrite and fluorescent write, thereby improving reception sensitivity. The modulated signals are then inputted in a luminous element driver 104, and the luminous element driver 104 drives a luminous element 106, and generates an infrared optical signal corresponding to the inputted signal. Here, as for the luminous element 106, LED (Write Emit Diode), one of the typical optical transmitting elements, is widely used.

The infrared optical signal is received to a receiving element 202 of the receiver 200. Typically used optical transmitting element for the receiving element 202 is a photodiode. The receiving element 202 provides an electric signal corresponding to the received infrared optical signal to an amplifier 240. The amplifier 240 sends the signal provided by the receiving element 202 to a demodulator 206. The demodulator 206 demodulates the amplified signal and provides it to the wall television receiver as the AV signals.

Based on the operation system as described above, the conventional infrared transmitter/receiver can interface the sources with the wall television receiver wirelessly, and in result, people do not have to be bothered so much with a place where to install the wall television receiver, not ruining the beauty of the wall at the same time.

Moreover, anyone can freely install the conventional infrared transmitting/receiving apparatus because the infrared optical signal is available to everyone and its use was not against the radio regulation at all. Further, although the optical signal can not pass through an obstacle, its short transmission distance is very effective to maintain the security.

In the meantime, the conventional infrared transmitter/receiver has been originally developed for the transmission of analog signals of an NTSC (National Television System Committee) type. Accordingly, the transmission band of the commercialized infrared transmitting/receiving apparatus is limited to below NTSC under the influence of the modulator, characteristics of the high output LED driver, the photo diode, and the demodulator.

However, as more digital technologies are under the development, and most of multimedia signals including PC signals are digitalized, the infrared transmitting/receiving apparatus is no longer attractive to the users. Instead, a wireless transmitting/receiving apparatus that is inexpensive yet capable of transmitting and receiving a great amount of digital data needs to be developed more than ever.

DISCLOSURE OF THE INVENTION

It is, therefore, an object of the present invention to provide a wireless transmitting/receiving apparatus and a method thereof, in order to transmit and receive a large amount of digital data wirelessly using an inexpensive wireless transmitting/receiving apparatus that has already been commercialized.

To achieve the above object, there is provided a wireless transmitting apparatus which includes a data converter for mapping multibit digital data by a data symbol in accordance with a predetermined mapping table, converting the data symbol to an analog signal, and outputting the analog signal; and a wireless transmitter for modulating the analog signal and transmitting the modulated signal wirelessly.

In another aspect of the present invention, there is provided a wireless receiving apparatus which includes a wireless receiver for receiving a wireless signal and for modulating the signal to an analog signal; a data restoration section for converting the analog signal to a digital signal, inverse-symbol-mapping the digital signal onto digital data in accordance with a predetermined mapping table, and outputting the digital data.

BRIEF DESCRIPTION OF THE DRAWINGS

The above object, other features and advantages of the present invention will become more apparent from the following detailed description when taken in conjunction with the accompanying drawings, in which.

BEST MODE FOR CARRYING OUT THE INVENTION

Preferred embodiments of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

According to the present invention, it is possible to transmit and receive digital data through an inexpensive transmitting/receiving apparatus by converting the digital data to NTSC (National Television System Committee) signal that is one of AV signals, using a commercial wireless transmitting/receiving apparatus. Furthermore, the present invention provides a method of mapping multibit digital data by a single data symbol, thereby enabling to transmit large amounts of digital data through a limited transmission band.

Figure 2:
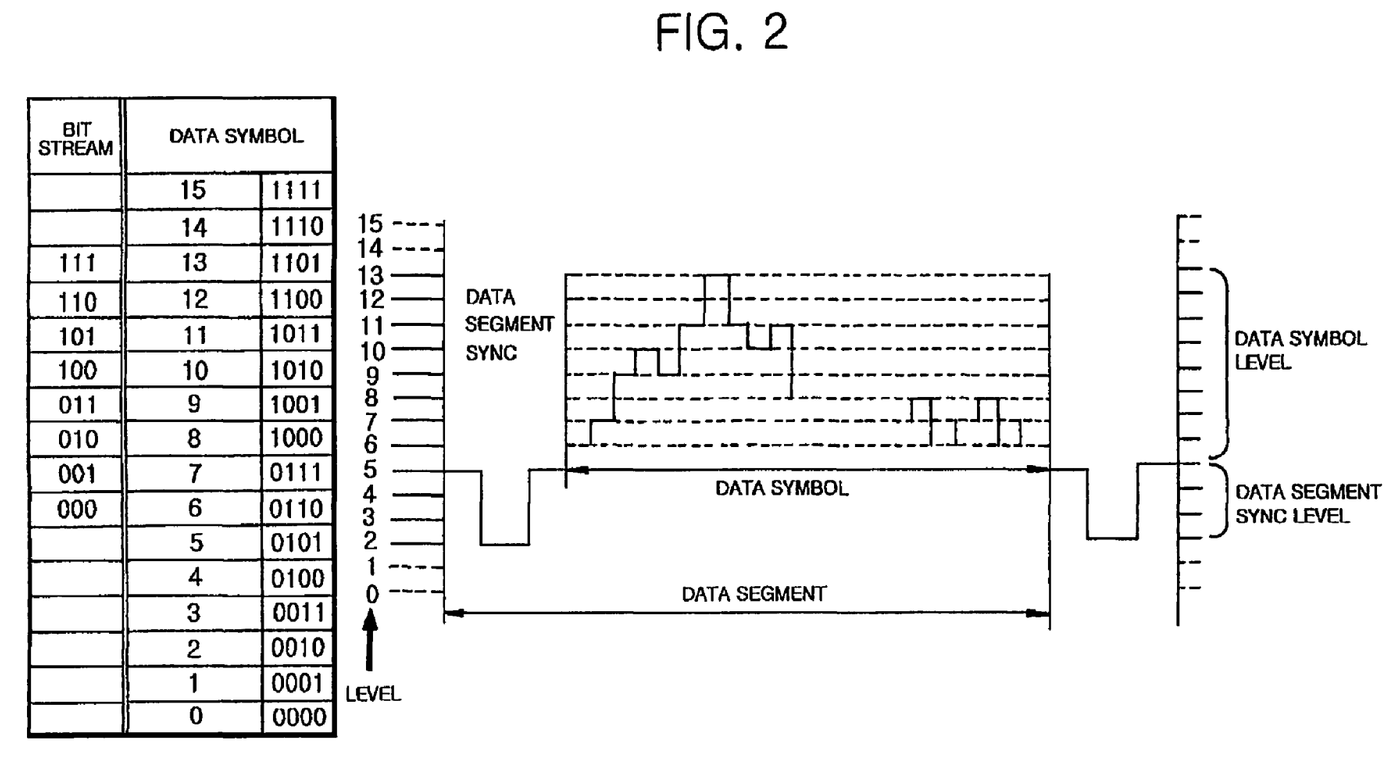
FIG. 2 is a view illustrating a data symbol format according to a preferred embodiment of the present invention.

The data segment, as shown in FIG. 2, includes a sync symbol and a data symbol. For instance, the data segment can include 10 sync symbols and 100 data symbols. In such case, if a data segment were designated as 1[H], 1[H] would correspond to all the 110 symbols. Particularly, the sync symbol is obtained by symbolizing the sync signal for extracting the data symbol, while the data symbol is obtained by mapping the multibit digital data. The data segment has a total of 16 levels ranging from level 0 through level 15. The levels from 0 through 5 are sync symbol levels, representing sync symbols, and the levels from 6 through 13 are data symbol levels, representing valid data symbols. Therefore, the present invention differentiates the sync symbol levels and the data symbol levels, which consequently makes it much easier to extract the sync symbols among others as well as to make the formation of the data segment be similar to the NTSC signal. Here, the level of the data segment can be 4-bit data (one of 0000 through 1111)

One of the data symbols conducts mapping 3-bit digital data. In other words, the digital data from 000 through 111 are mapped to the data symbols of level 6 through level 13, respectively. Accordingly, the rate of the data symbol is one third of the rate of the digital data. In such manner, the preferred embodiment of the present invention introduced the 8-level mapping method for mapping 3-bit digital to a single data symbol. However, if the user wishes to increase the transmission rate, he can increase the bit number of digital data that are mapped per data symbol. One thing to be aware when increasing the bit number of digital data that are mapped per data symbol, even though the receiver might have the equivalent SNR (Signal to Noise Ratio), a decision level is relatively decreased, which consequently increases the error percentage of the receiver. Therefore, the number of mapping levels should be determined very carefully in consideration with the characteristic of the SNR of the transmitting/receiving channel.

Now the transmitting/receiving apparatus m accordance with the first preferred embodiment of the present invention is explained with reference to FIGS. 3 through 6.

Figure 3:
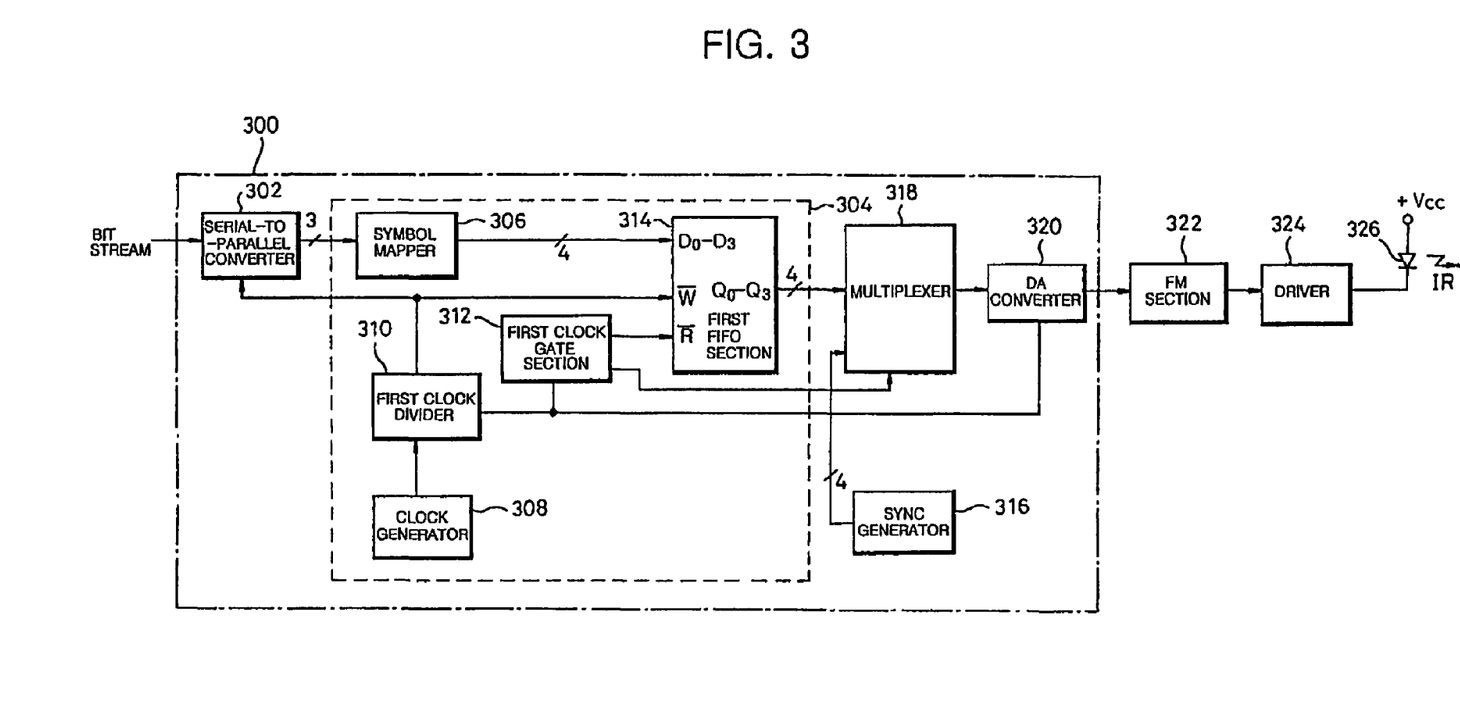
FIG. 3 is a block diagram illustrating a wireless transmitting apparatus according to a first embodiment of the present invention.

FIG. 3 is a block diagram illustrating the transmitting/receiving apparatus according to the first preferred embodiment of the present invention. As shown in FIG. 3, a bit stream transmitted from the signal source is inputted to a serial to parallel converter 302 in a data converter 300. The serial to parallel converter 302 converts the bit stream that has been inputted in serial according to a clock provided by a first clock divider 310 to 3-bit section, and output terminals the bit stream in parallel. The bit stream that is outputted in parallel on the section of 3-bit is then inputted in a symbol mapper 306 in a symbol mapper 304. Here, the symbol mapper 306 conducts mapping of the 3-bit bit stream to a single data symbol with reference to a mapping table. The mapping table shows the digital data from 000 through 111 that are mapped to the data symbols from level 6 through level 13. A first FIFO section 314, or a buffer, writes up the data symbols serially in accordance with a write clock provided by the first clock divider 310, and reads the data symbols serially in accordance with a read clock before outputting the data symbols. As for the first FIFO section 314, a dual async FIFO can be used. In the meantime, a first gate section 312 starts to count the clock that has been inputted, and proceeds to provide the read clock to the first FIFO 314 at the point where the count value reaches a first fixed number. In the subject situation, if the count value reaches a second fixed number, the first clock gate section 312 discontinues providing of the read clock and counting process, and starts to count again. In short, the first clock gate section 312, providing that the whole data segment is 1[H], provides the read clock to the first FIFO section 314 during the period of the whole data segment being occupied by the data symbols, while stops outputting the read clock during the period of the whole data segment being occupied by the sync symbols. That is to say, suppose that the data segment is composed of a total of 110 symbols, i.e., 100 data symbols and 10 sync symbols, the first clock gate section 312 outputs the read clock during the data symbol period according to an equation 1, while discontinues outputting the read clock during the sync symbol period according to an equation 2 as follows:

$$\text{Data Symbol Period} = 1[H] \times (100/110) \qquad \text{EQ. (1)}$$

$$\text{Synchronous Symbol Period} = 1[H] \times (10/110) \qquad \text{EQ. (2)}$$

Accordingly, the first FIFO 314, according to the read clock, reads the data symbols only in a portion where the data symbols are located in the whole data segment, and provides the data symbols to a multiplexer 318. And, a sync generator 316 generates the sync symbols manifesting the synchronism of the data segment, and provides the sync symbols to the multiplexer 318. Here, the multiplexer 318 generates a single data segment by multiplexing the data symbols and the sync symbols. The data segment generated in this way is then inputted in a DA (Digital to Analog) converter 320. The DA converter 320 converts the inputted data segment to analog signal, and provides it to a frequency modulation section 322. The frequency modulation section 322 modulates the inputted analog signal to frequency, provides the frequency to a driver 324. The driver 324 operates a luminous element 326 in order to generate a corresponding infrared signal (IR) to the modulated signal. Typically used elements for the conventional A/V infrared transmitter can be employed for the luminous element 326.

Figure 4:
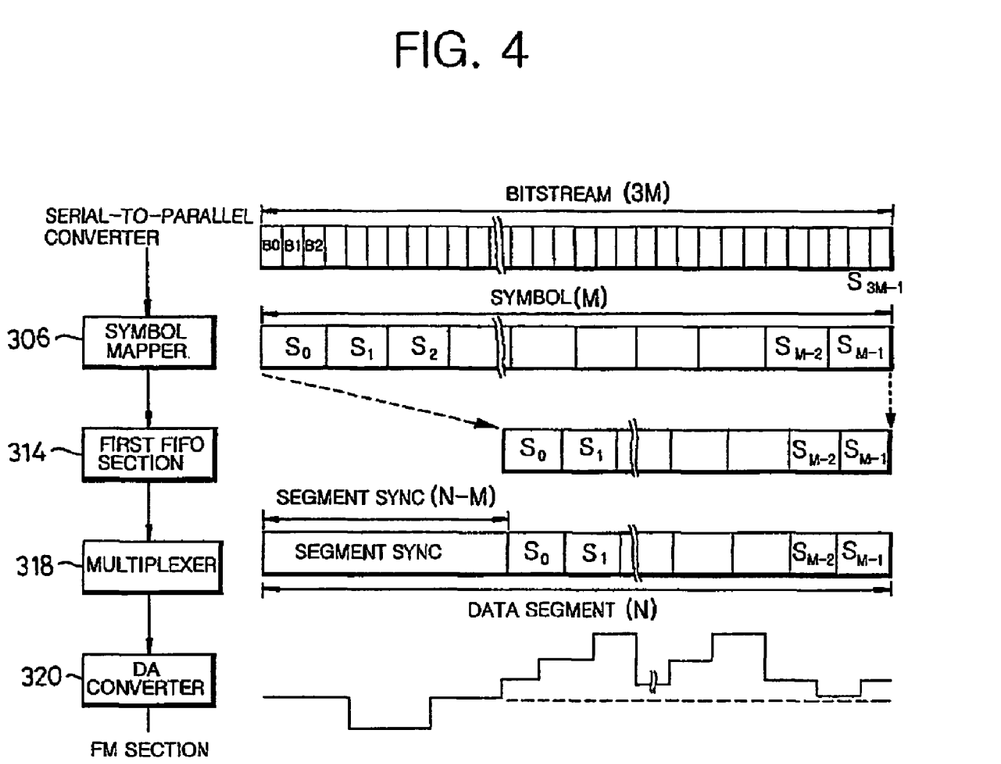
FIG. 4 is a view illustrating a process of the wireless transmitting apparatus shown in FIG. 3.

The operation of the wireless transmitting apparatus is now explained with reference to FIG. 4. The parallel data provided by the serial to parallel converter 302 is converted to the data symbol by the symbol mapper 306. The data symbol is inputted in the multiplexer 318 through the first FIFO section (314), and the multiplexer 318 generates the data segment by inserting the sync symbol of the first fixed number to each data symbol of the second fixed number. The data segment is then converted to the analog signal through the DA converter 320, and is inputted in the frequency modulation section 322.

Figure 5:
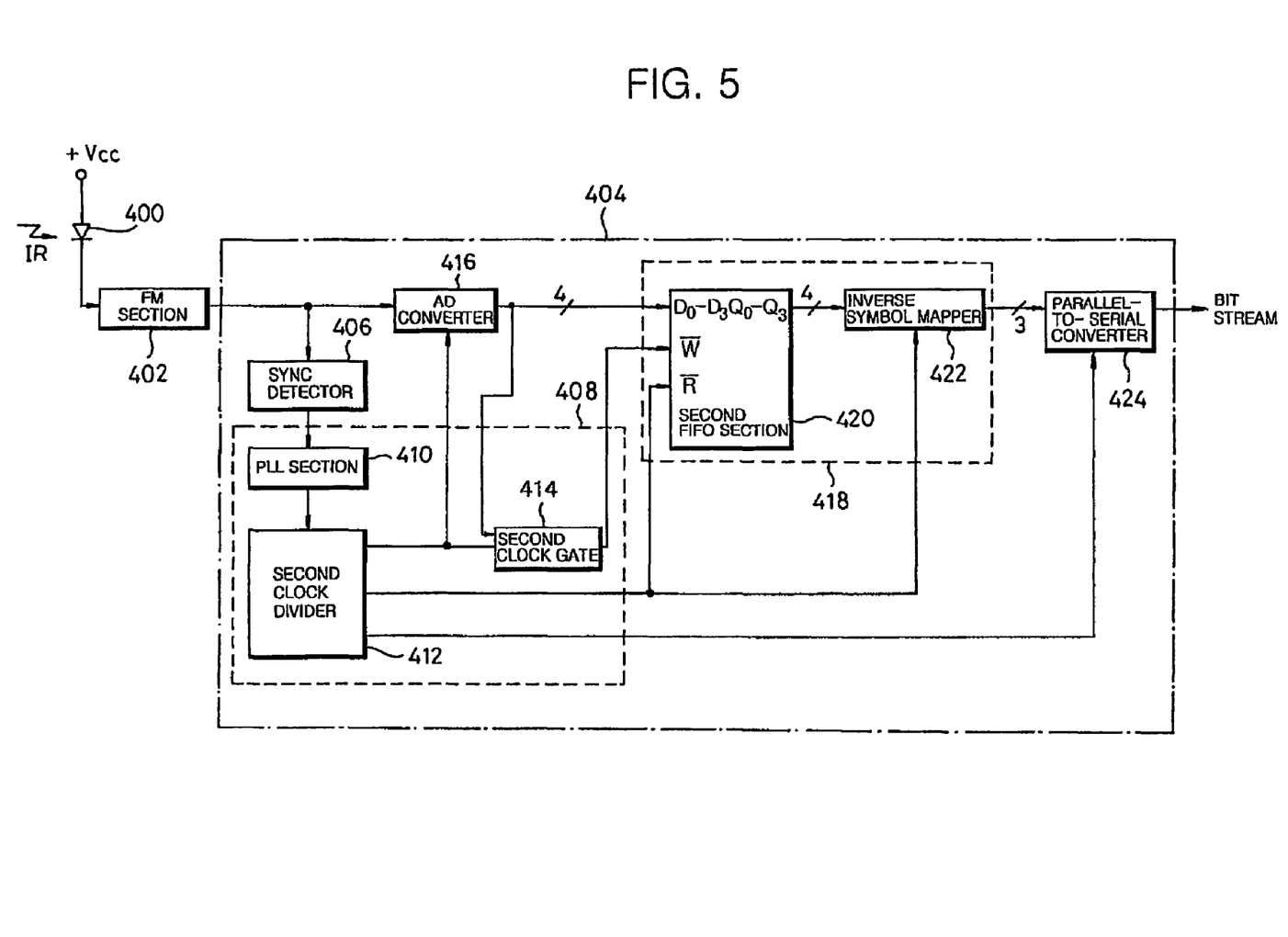
FIG. 5 is a block diagram illustrating a wireless receiving apparatus according to the first embodiment of the present invention.

Referring to FIG. 5, the wireless receiving apparatus in accordance with the first preferred embodiment of the present invention is now explained.

A receiving element 400 receives the infrared signal (IR), converts it to an electric signal, and provides the electric signal to the FM (Frequency Modulation) demodulator 402. The FM demodulator 402 demodulates the inputted electric signal, and inputs the signal in the AD (Analog to Digital) converter 416 and a sync detector in a data restoration section 404, respectively. Typically used elements for the conventional AN infrared transmitter can be employed for the luminous element 326 as well.

The sync detector 406 detects a sync level interval of an outputting signal of the FM demodulator 402, and generates a corresponding sync signal to provide it to a PLL (Phase Locked Loop) section 410 in a clock regenerator 408. The PLL section 410 generates a stabilized reference clock in accordance with the sync signal, and provides the reference clock to a second clock divider 412. Based on the reference clock, the second clock divider 412 generates a variety of clocks and provides them to each section.

The AD converter 416 converts the analog signal provided by the FM demodulator 402 to the digital data, and outputs the digital data according to the clock provided by the FM demodulator 402. Here, the AD converter 416 outputs 4-bit digital data. The 4-bit digital data is then provided to a second FIFO section 420 in an inverse symbol mapping section 418.

A second clock gate 414 detects the level of the receiving signal through the 4-bit digital data outputted by the AD converter 416. If the detected level is one of the data symbol levels, the second clock gate 414 provides a write clock from the second clock divider 412 to the second FIFO section 420. The second FIFO section 420, or the buffer, writes up the 4-bit digital data that have been provided by the AD converter 410 in accordance with the write clock. The 4-bit digital data becomes the data symbol. In other words, among other data segments received, only the data symbol is saved in the second FIFO section 420. The data symbol saved into the second FIFO section 420 is then read according to the read clock of the second FIFO section 420 that is provided by the second clock divider 412, and is provided to the inverse symbol mapper 422. Here, the read clock rate the second clock divider 412 outputs is designated lower than the write clock rate. It is done so to compensate the more increase in the data symbols being read compared with the data symbols that are lit up, as the sync symbols included in the data segment are eliminated.

The inverse symbol mapper 422 conducts an inverse symbol mapping of the data symbol provided by the second FIFO section 420 to a bit stream, and outputs the bit stream in parallel as 3-bit section. The bit stream outputted as 3-bit section is inputted in a parallel to serial converter 424. The parallel to serial converter 424 converts the inputted 3-bit parallel bit stream to serial bit stream, and provides the bit stream to the wall television receiver.

Figure 6:
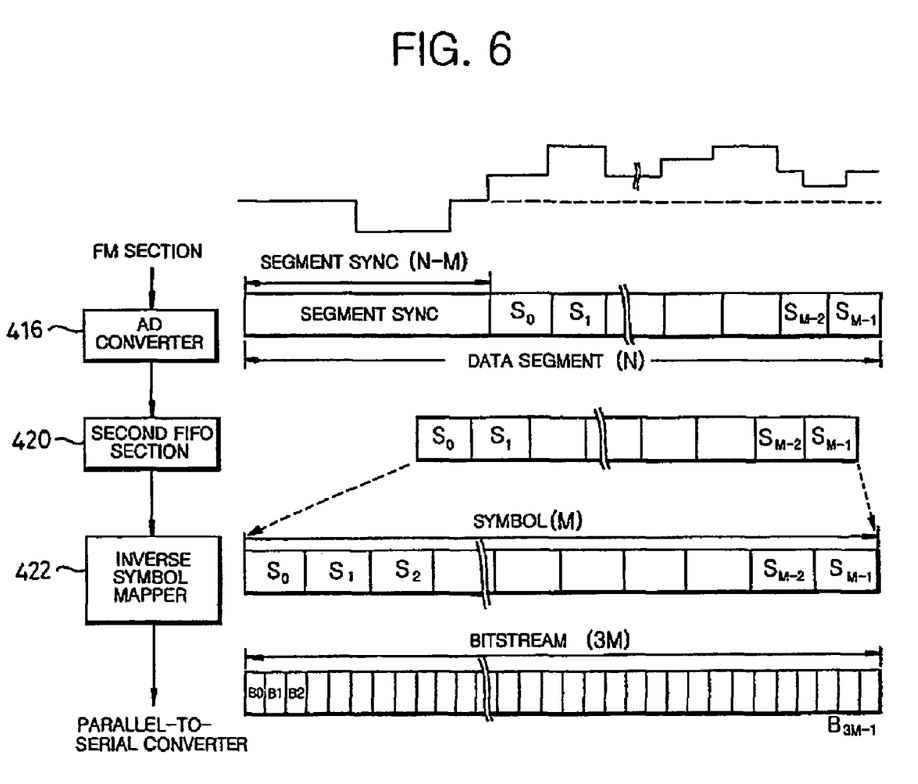
FIG. 6 is a view illustrating a process of the wireless receiving apparatus shown in FIG. 4.

The operation of the wireless receiving apparatus is now explained with reference to FIG. 6. As shown in FIG. 6, the demodulated signal provided by the FM demodulator 402 is inputted in the AD converter 416. The AD converter 426 converts the inputted signal to digital data, and provides the digital data to the second FIFO section 420. At this time, the data outputted from the AD converter 416 is the data segment including sync symbols and data symbols. Among other symbols in the data segment, only the data symbols are saved in the second FIFO section 420 in the second clock gate section 414. Afterwards, the inverse symbol mapper 422 conducts the inverse symbol mapping of the data symbols saved in the second clock gate section 414, and outputs the data symbols as a bit stream of 3-bit section in parallel. Finally, the bit stream is saved in the parallel to serial converter 424.

Another aspect of the present invention provides a wireless transmitting/receiving apparatus in accordance with a second preferred embodiment of the present invention, which is illustrated in FIGS. 7 through 10.

Figure 7:
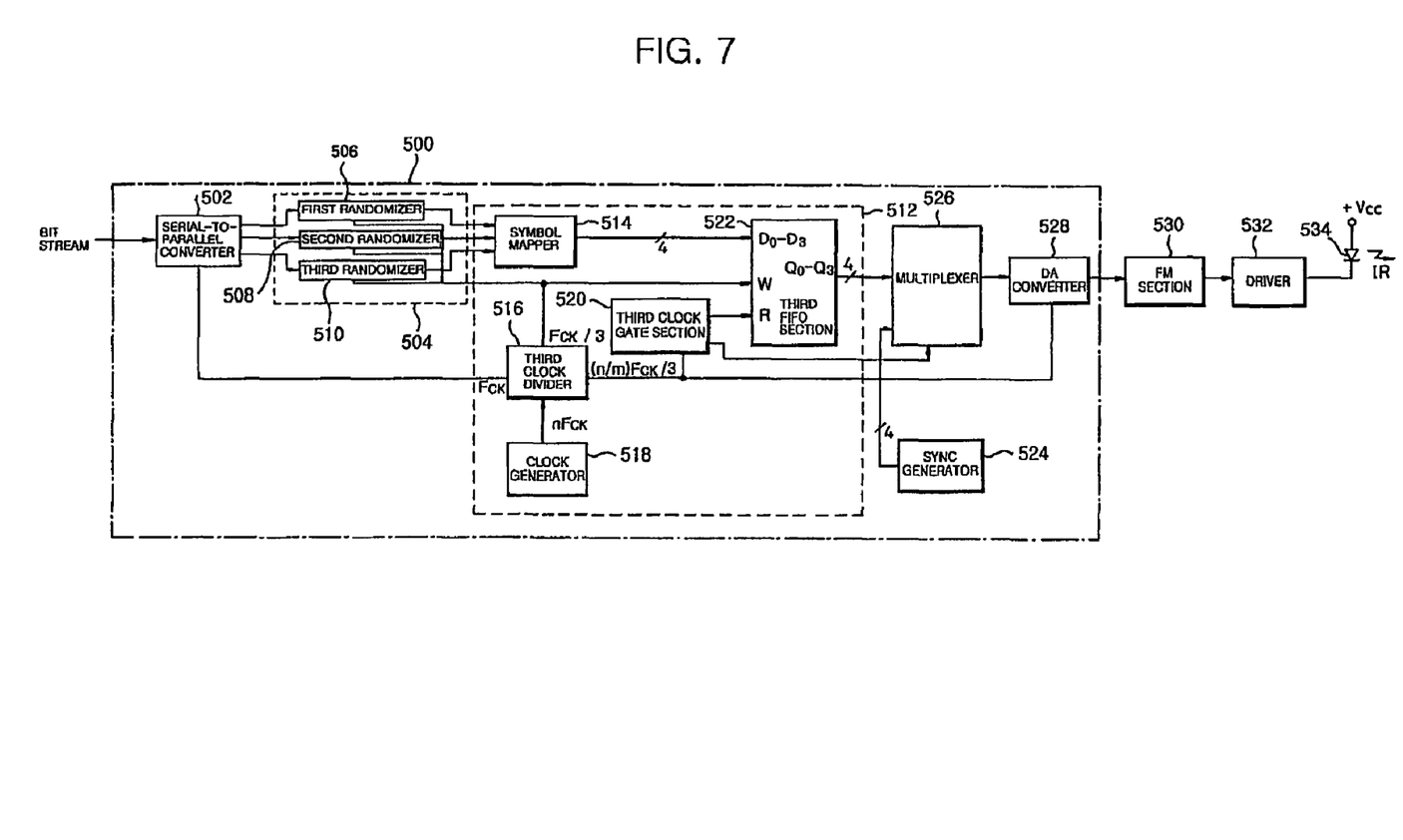
FIG. 7 is a block diagram illustrating a wireless transmitting apparatus according to a second embodiment of the present invention.

The element and operation of the wireless transmitting/receiving apparatus according to the second preferred embodiment of the present invention is first explained with reference to FIG. 7. The bit stream inputted by the signal source is inputted in the serial to parallel converter 502 in the data converter 500. The serial to parallel converter 502 outputs the bit stream, inputted in serial according to the clock (Fck) provided by a third clock divider 516, as 3-bit section in parallel. The bit stream outputted in parallel as 3-bit stream is inputted in a randomizer 504. The randomizer 504 randomizes the bit stream in order to prevent unstableness during DC coupling. The randomizer 504 includes a first through a third randomizer (506 through 510), each randomizer being connected to an output, respectively, in the serial to parallel converter 502 where three output terminals are available. Since the first through the third randomizers (506 through 510) have the same constitution, only the first randomizer 506 is explained with reference to FIG. 8.

Figure 8:
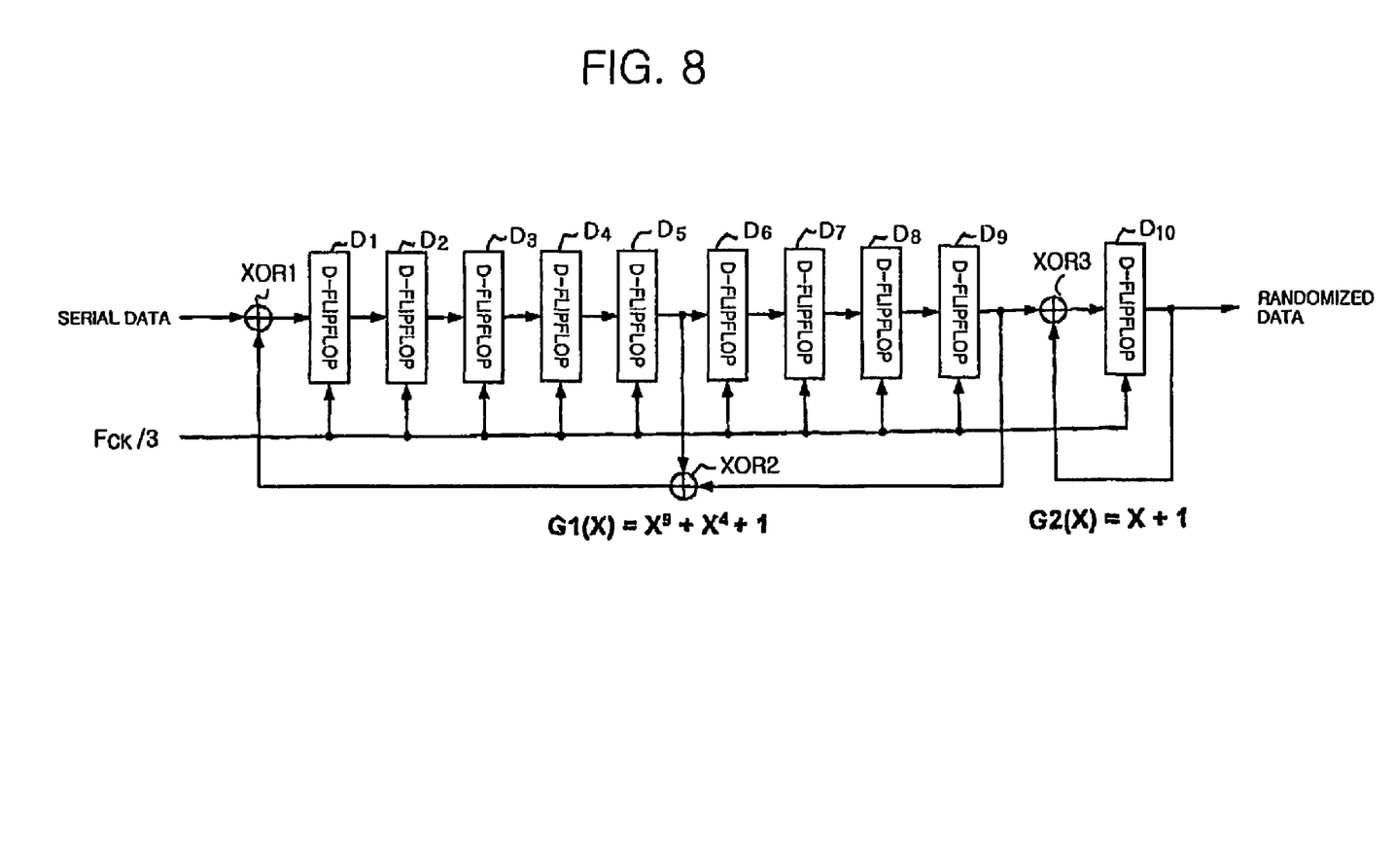
FIG. 8 is a detail circuit diagram of a first randomizer of FIG. 7.

The first randomizer 506 includes a first through a third exclusive OrGate (OXR1 through XOR3), and a first through a tenth D-FlipFlops (D1 through D10). The first randomizer 506 conducts the randomization process on the digital data based on the following equations 3 and 4.

$$G1(X) = X^9 + X^4 + 1 \qquad \text{EQ. (3)}$$

$$G2(X) = X + 1 \qquad \text{EQ. (4)}$$

The 3-bit bit stream that went through the randomization process of the randomizer 504 is inputted in the symbol mapper 514 in the symbol mapping section 512. The symbol mapper 514 conducts mapping of the 3-bit bit stream as a single data symbol with reference to the mapping table, and outputs the data symbol. A third FIFO section 522 writes up the data symbol in consecutive order of the write clock (Fck/

3) provided by the first clock divider 516, reads the data symbol in order of the read clock (n/m) (Fck/3), and then outputs the data symbol. The third clock gate section 520 starts to count the clock inputted, and proceeds to provide the lead clock to the third FIFO section 522 at the point where the count value reaches the first fixed number. In the subject situation, if the count value reaches the second fixed number, the third clock gate section 520 discontinues providing of the read clock and counting process, and starts to count again.

In short, according to the read clock, the third FIFO section 522 reads the data symbols only in a portion where the data symbols are located out of the whole data segment, and provides the data symbols to the multiplexer 526. And, the sync generator 524 generates sync symbols and provides them to the multiplexer 526. The multiplexer 526 multiplexes the data symbols and the sync symbols, and generates a data segment using them. The data segment generated is inputted in a DA (Digital to Analog) converter 528. The DA converter 528 converts the data segment to analog signal, and provides the analog signal to the FM demodulator 530. Then, the analog signal undergoes the FM demodulation process by the FM demodulator 530, and is provided to a driver 532. The driver 532 drives the luminous element 534 to generate a corresponding infrared signal (IR) to the modulated signal.

Figure 9:
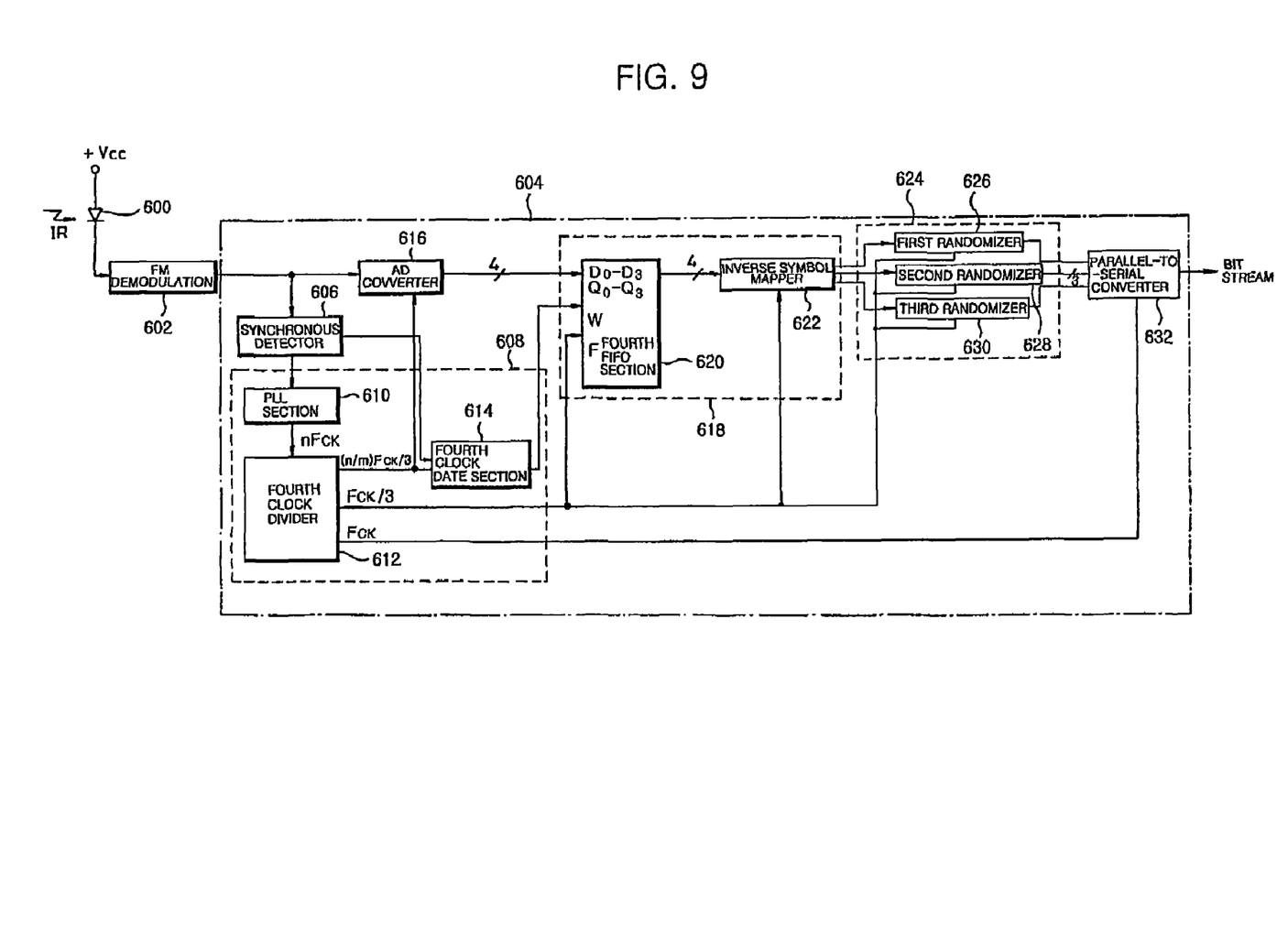
FIG. 9 is a block diagram illustrating a wireless receiving apparatus according to the second embodiment of the present invention.

FIG. 9 is a block diagram illustrating the wireless receiving apparatus in accordance with the second preferred embodiment of the present invention.

The receiving element 600 receives the infrared signal, converts the infrared signal to the electric signal, and provides it the FM demodulator 602. The FM demodulator 602 demodulates the inputted electric signal, and inputs the signal in the AD converter 616 and the sync detector 606 in the data restoration section 604. As for the receiving element 600 and the FM demodulator 602, the elements of the conventional A/V infrared receiver can be employed.

The sync detector 606 detects the sync level interval of output signal of the FM demodulator 602, generates the corresponding sync signal, and provides the sync signal to the PLL section 610 in the clock regenerator 608. The PLL section 610 generates a stabilized reference clock (nFck) in accordance with the sync signal, and generates the reference clock to a fourth clock divider 612. The fourth clock divider 612, based on the reference clock, generates a variety of clocks (e.g., Fck, Fck/3, (n/m) Fck/3), and provides them to each section.

The AD converter 616 converts the analog signal provided by the FM demodulator 602 to digital data, and outputs the digital data according to the clock provided by the fourth clock divider 612. Here, the AD converter 616 outputs the digital data as 4-bit data. The 4-bit digital data is then provided to the inverse mapping section 618 and a fourth FIFO section 620.

A fourth clock gate 614 provides the clock ((n/m Fck/3) as the write clock provided by the fourth clock divider 612 to the fourth FIFO section 620, only when the sync detector 606 does not output the sync signal. The fourth FIFO section 620 writes up the 4-bit digital data provided by the AD converter 610 in accordance with the write clock, and the 4-bit digital data becomes the data symbol. That is, only the data symbol among other data segment received is saved in the fourth FIFO section 620. Then the data symbol saved in the fourth FIFO section 620 is read according to the read clock (Fck/3) provided by the fourth clock divider 612, and is provided to the inverse symbol mapper 622. Here, the rate of the read clock (Fck/3) outputted by the second clock divider 412 is designated to be lower than the rate of the write clock ((n/m) Fck/3).

The data symbol provided by the fourth FIFO section 620 undergoes the inverse symbol mapping by the inverse symbol mapper 622, and the inverse symbol mapper 622 outputs the data symbol as 3-bit bit stream in parallel. The bit stream outputted in parallel as 3-bit is inputted in a derandomizer 624. The derandornizer 624 includes a first through a third derandomizers (626 through 630). Since the first through the third derandomizers (626 through 630) have the same constitution, only the first dirandomizer is explained here with reference to FIG. 10.

Figure 10:
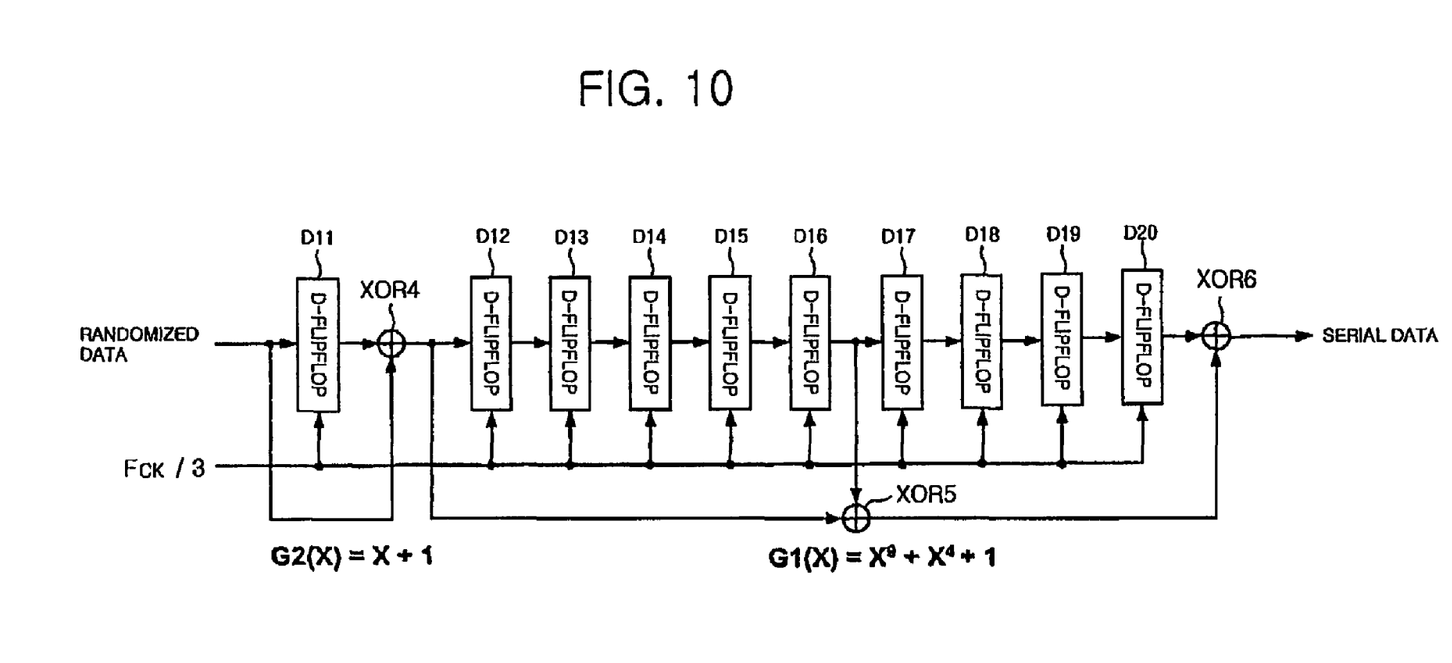
FIG. 10 is a detail circuit diagram of a first derandomizer of FIG. 9.

As shown in FIG. 10, the first derandomizer 626 includes a fourth through a sixth exclusive OrGates (XOR4 through XOR6), and an eleventh through a twentieth D-FlipFlops (D11 through D20). The first derandomizer 626 performs the derandomization process on the digital data based on the following equations 5 and 6 below.

$$G2(X)=X+1 \quad \text{EQ. (5)}$$

$$G1(X)=X^9+X^4+1 \quad \text{EQ. (6)}$$

The derandomized bit stream outputted is then inputted in the parallel to serial converter 632. The parallel to serial converter 632 converts the inputted 3-bit parallel bit stream into a serial bit stream, and provides the serial bit stream to the wall television receiver.

INDUSTRIAL APPLICABILITY

In conclusion, the present invention is very economical and useful because it employs a commercial and small sized and inexpensive analog wireless transmitting/receiving apparatus, in order to transmit and receive large amounts of digital data wirelessly.

While the invention has been described in conjunction with various embodiments, they are illustrative only. Accordingly, many alternative, modifications and variations will be apparent to persons skilled in the art in write of the foregoing detailed description. The foregoing description is intended to embrace all such alternatives and variations falling with the spirit and broad scope of the appended claims.

What is claimed is:

1. A wireless receiving apparatus, comprising:
   a wireless receiver for demodulating a received wireless signal received to an analog signal; and
   an analog to digital(AD) converter for converting the analog signal to a digital signal;
   an inverse symbol mapping section for inverse-symbol-mapping the digital signal outputted from the AD converter onto multibit digital data in accordance with a predetermined mapping table, when a read clock is provided;
   a sync detector for extracting a sync signal from the analog signal; and
   a clock generating section for detecting data symbol region based on the sync signal, and for generating the read clock when the data symbol region is detected, wherein the clock generating section comprises:
   a PLL section for generating a reference clock based on the sync signal;
   a clock divider for generating a write clock and a read clock to be provided to a buffer by dividing the reference clock, and for providing the read clock to the buffer; and
   a clock gate section for providing the write clock received to the buffer when the sync detector does not detect a sync signal, and not providing the write clock to the buffer when the sync detector detects a sync signal.

2. The apparatus of claim 1, further comprises
a parallel to serial converter for converting the multibit digital data outputted from the inverse symbol mapping section to a serial data and for outputting the data.

3. The apparatus of claim 1, wherein the inverse symbol mapping section comprises:
the buffer for buffering a data symbol only among other digital signals received by the AD converter;
an inverse symbol mapper for converting the data symbol to the multibit digital data in accordance with the mapping table.

4. A wireless receiving apparatus, comprising:
a wireless receiver for demodulating a received wireless signal received to an analog signal; and
an analog to digital(AD) converter for converting the analog signal to a digital signal;
an inverse symbol mapping section for inverse-symbol-mapping the digital signal outputted from the AD converter onto multibit digital data in accordance with a predetermined mapping table, when a read clock is provided;
a sync detector for extracting a sync signal from the analog signal; and
a clock generating section for detecting data symbol region based on the sync signal, and for generating the read clock when the data symbol region is detected, wherein the clock generating section comprises:
a PLL section for generating a reference clock based on the sync signal;
a clock divider for generating a write clock and a read clock to be provided to a buffer by dividing the reference clock, and for providing the read clock to the buffer; and
a clock gate section for providing the write clock received to the buffer when an output level of the Analog to Digital converter corresponds to a level of the data symbol, and not providing the write clock to the buffer when the output level of the Analog to Digital converter corresponds to a level of the sync symbol.

5. The apparatus of claim 1, further comprises
a derandomizer for derandomizing a multibit digital data outputted from the inverse symbol mapping section, being connected between the inverse symbol mapping section and the parallel to serial converter.

6. A wireless receiving method, comprising:
(a) restoring an analog signal using a wireless signal received;
(b) converting the analog signal to a digital signal;
(c) extracting a data symbol from the digital signal; and
(d) converting the data symbol to a multibit digital data in accordance with a predetermined mapping table, and outputting the multibit digital, wherein the method further comprises:
generating a reference clock based on a sync signal obtained from a sync level interval of the restored analog signal;
generating a write clock and a read clock from the reference clock;
providing the write clock to cause a buffer to write the data symbol extracted from the digital signal; and
providing the read clock to cause the buffer to output the data symbol for conversion in (d), wherein the write clock is provided to the buffer when a sync detector does not detect the sync signal, and wherein the write clock is not provided to the buffer when the sync detector detects the sync signal.

* * * * *